(12) United States Patent
Tanaka et al.

(10) Patent No.: US 11,101,739 B2
(45) Date of Patent: Aug. 24, 2021

(54) CONTROL DEVICE WITH MAGNETIC FLUX DENSITY CALCULATION

(71) Applicant: HITACHI AUTOMOTIVE SYSTEMS, LTD., Hitachinaka (JP)

(72) Inventors: Shintaro Tanaka, Tokyo (JP); Kenji Kubo, Hitachinaka (JP); Takayuki Ouchi, Hitachinaka (JP); Yuji Sobu, Hitachinaka (JP); Naoya Takahashi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/757,201

(22) PCT Filed: Oct. 4, 2018

(86) PCT No.: PCT/JP2018/037158
§ 371 (c)(1),
(2) Date: Apr. 17, 2020

(87) PCT Pub. No.: WO2019/078013
PCT Pub. Date: Apr. 25, 2019

(65) Prior Publication Data
US 2021/0135578 A1 May 6, 2021

(30) Foreign Application Priority Data
Oct. 17, 2017 (JP) .............................. JP2017-201403

(51) Int. Cl.
*H02M 3/337* (2006.01)
*B60L 58/20* (2019.01)
(Continued)

(52) U.S. Cl.
CPC .............. *H02M 3/337* (2013.01); *B60L 58/20* (2019.02); *H02M 1/08* (2013.01); *H02M 1/40* (2013.01);
(Continued)

(58) Field of Classification Search
CPC ...... H02M 1/0054; H02M 1/40; H02M 3/337; H02M 3/33569; H02M 7/53;
(Continued)

(56) References Cited

U.S. PATENT DOCUMENTS

2010/0283447 A1 11/2010 Tachibana et al.
2012/0113687 A1 5/2012 Wildrick
(Continued)

FOREIGN PATENT DOCUMENTS

JP 63-099767 A 5/1988
JP 08-317646 A 11/1996
(Continued)

OTHER PUBLICATIONS

German Office Action dated Feb. 26, 2021 for German Patent Application No. 112018004544.7.
(Continued)

*Primary Examiner* — Yusef A Ahmed
(74) *Attorney, Agent, or Firm* — Volpe Koenig

(57) ABSTRACT

A switching loss of a power conversion device is sufficiently reduced. A DC-DC converter includes a switching circuit that converts input first DC power into AC power, a transformer that performs voltage conversion of the AC power, and an output circuit that converts the AC power subjected to the voltage conversion by the transformer into second DC power. The control circuit that controls the DC-DC converter calculates a magnetic flux density value B of the transformer and controls a drive frequency of the switching circuit based on the calculated magnetic flux density value B.

15 Claims, 12 Drawing Sheets

(51) Int. Cl.
  *H02M 1/08* (2006.01)
  *H02M 1/40* (2007.01)
  *H02M 7/537* (2006.01)
  *H02M 3/335* (2006.01)
  *H02M 1/00* (2006.01)

(52) U.S. Cl.
  CPC ....... *H02M 3/33573* (2021.05); *H02M 7/537* (2013.01); *B60L 2210/10* (2013.01); *B60L 2240/525* (2013.01); *H02M 1/0054* (2021.05)

(58) Field of Classification Search
  CPC . H02N 3/33573; B60L 58/20; B60L 2210/10; B60L 2240/525
  See application file for complete search history.

(56) References Cited

U.S. PATENT DOCUMENTS

| | | | | |
|---|---|---|---|---|
| 2014/0347767 | A1* | 11/2014 | Nakamura | H02H 7/1213 |
| | | | | 361/18 |
| 2015/0003116 | A1* | 1/2015 | Karlsson | H02M 1/40 |
| | | | | 363/17 |
| 2016/0197557 | A1* | 7/2016 | Namba | H02M 1/44 |
| | | | | 363/21.12 |
| 2018/0115251 | A1* | 4/2018 | Tschirhart | H02M 1/32 |
| 2018/0166903 | A1* | 6/2018 | Sato | B60L 53/20 |
| 2019/0280603 | A1* | 9/2019 | Tomita | H02M 3/33569 |
| 2019/0312519 | A1* | 10/2019 | Iida | H02M 3/33576 |
| 2019/0393792 | A1* | 12/2019 | Toyoda | H02M 3/33523 |
| 2020/0186032 | A1* | 6/2020 | Takahashi | H02M 3/156 |
| 2020/0266699 | A1* | 8/2020 | Takahara | H02M 1/38 |
| 2021/0083588 | A1* | 3/2021 | Yaegaki | H02M 1/32 |

FOREIGN PATENT DOCUMENTS

| | | |
|---|---|---|
| JP | 2008-278723 A | 11/2008 |
| JP | 2014-236653 A | 12/2014 |
| JP | 2017-189011 A | 10/2017 |
| KR | 10-2015-0127855 A | 11/2015 |

OTHER PUBLICATIONS

International Search Report, PCT/JP2018/037158, dated Dec. 18, 2018, 1 pg.

* cited by examiner

FIG. 7
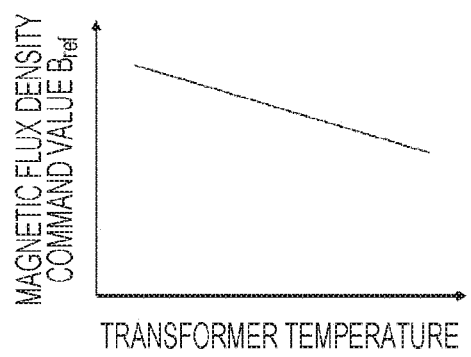
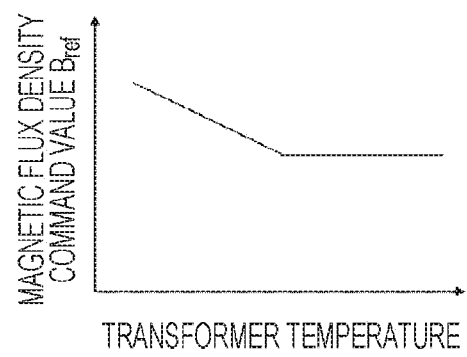

FIG. 9
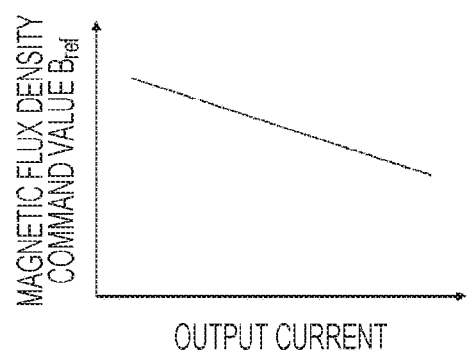
(a)
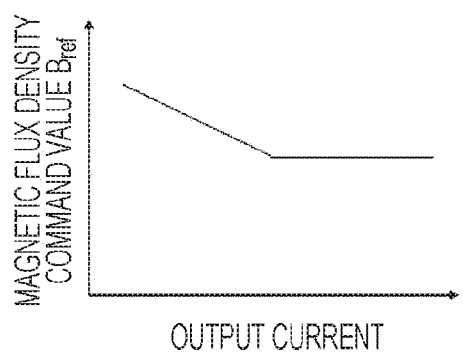
(b)

FIG. 11
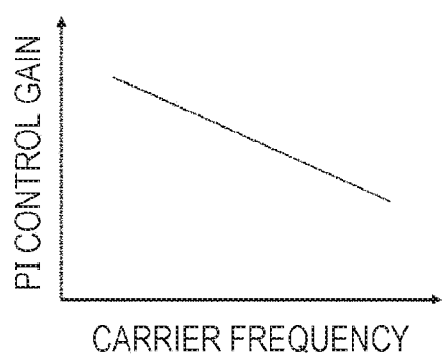
(a)
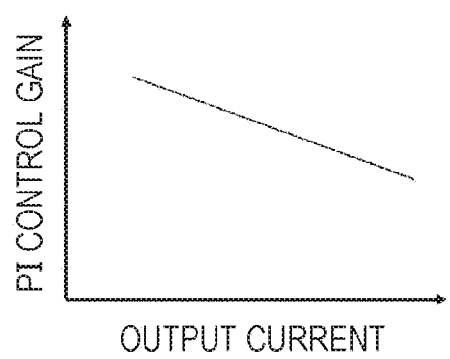
(b)

CONTROL DEVICE WITH MAGNETIC FLUX DENSITY CALCULATION

TECHNICAL FIELD

The present invention relates to a control device used for controlling a power conversion device.

BACKGROUND ART

In recent years, against the background of depletion of fossil fuels and global environmental problems, automobiles that run using electric energy, such as hybrid automobiles and electric automobiles, have been attracting more attention and have been put to practical use. Such an automobile that travels using electric energy is provided with a high-voltage battery that supplies electric power to a motor for driving wheels. Furthermore, some of such automobiles are provided with a power conversion device that lowers output power from the high-voltage battery and supplies necessary power to low-voltage electric devices mounted on the automobiles, such as an air conditioner, an audio device, and various electronic control units (ECUs). Such a power conversion device converts input DC power into DC power of a different voltage, and is also called a DC-DC converter.

Generally, a DC-DC converter has a switching circuit capable of switching on and off, and performs voltage conversion of DC power by controlling on/off of the switching circuit. Specifically, the input DC power is once converted into AC power by using the switching circuit, and the AC power is transformed (increased or lowered) by using a transformer. Then, the transformed AC power is converted into DC power again by using an output circuit such as a rectifier circuit. In this way, a DC output having a voltage different from the input voltage can be obtained. The switching circuit is constituted, for example, by a semiconductor switch element such as a metal-oxide-semiconductor field-effect transistor (MOSFET) or an insulated gate bipolar transistor (IGBT).

In general, a vehicle-mounted power conversion device is required to have high efficiency for the purpose of effective use of natural energy and reduction of carbon dioxide. Therefore, it is important to reduce loss during power conversion as much as possible. Examples of loss generated in the DC-DC converter include switching loss generated by a switching operation and resistance loss (copper loss) generated in a transformer and a semiconductor switch element. As means for reducing the switch element, for example, Patent Literature) is known. The power conversion device disclosed in Patent Literature 1 monitors a transformer current flowing into an insulating transformer and increases a switching carrier frequency when the transformer current exceeds a current reference value set in consideration of magnetic saturation. The power conversion device disclosed in Patent Literature 1 thus decreases a switching frequency and thereby reduces switching loss.

CITATION LIST

Patent Literature

PTL 1: JP 2008-278723 A

SUMMARY OF INVENTION

Technical Problem

In the technique described in Patent Literature 1, since the switching carrier frequency is controlled using the monitoring result of the transformer current, a control delay occurs when the change in the transformer current is abrupt, and as a result, a reduction of switching loss may be insufficient.

Solution to Problem

The control device according to the present invention controls a power conversion device that converts input first DC power into second DC power and supplies the second DC power, the power conversion device includes a switching circuit that converts the first DC power into AC power, a transformer that performs voltage conversion of the AC power, and an output circuit that converts the AC power subjected to the voltage conversion by the transformer into the second DC power, and the control device calculates a magnetic flux density value of the transformer and controls a drive frequency of the switching circuit based on the calculated magnetic flux density value.

Advantageous Effects of Invention

According to the present invention, switching loss of a power conversion device can be reduced sufficiently.

BRIEF DESCRIPTION OF DRAWINGS

FIG. 7 illustrates an example of a relationship between a transformer temperature and a magnetic flux density command value.

FIG. 9 illustrates an example of a relationship between an output current and a magnetic flux density command value.

FIG. 11 illustrates an example of a method for adjusting a PI control gain by a gain adjustment unit.

DESCRIPTION OF EMBODIMENTS

Figure 1:
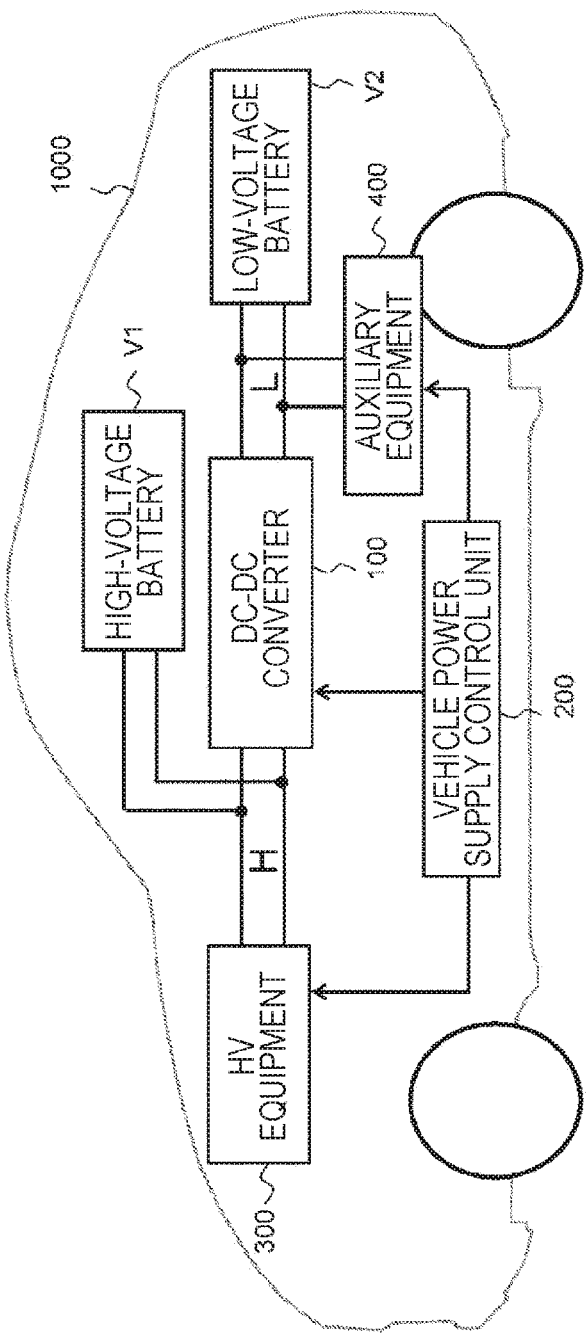
FIG. 1 illustrates a configuration of a vehicle power supply according to an embodiment of the present invention.

Hereinafter, embodiments of a power conversion device according to the present invention will be described with reference to the drawings. In each of the drawings, the same elements are denoted by the same reference numerals, and redundant description will be omitted. However, the present invention is not limited to the embodiments below and encompasses various modifications and application examples within the technical concept of the present invention.

First Embodiment (Configuration of Vehicle Power Supply)

FIG. 1 illustrates a configuration of a vehicle power supply according to one embodiment of the present invention. As illustrated in FIG. 1, the vehicle power supply according to the present embodiment is a power supply system that is mounted on a vehicle 1000 and mutually performs power conversion between a high-voltage battery V1 and a low-voltage battery V2 by using a DC-DC converter 100. Hereinafter, a low-voltage side of the DC-DC converter 100, that is, a side connected to the low-voltage battery V2 is referred to as an "L side", and a high-voltage side of the DC-DC converter 100, that is, a side connected to the high-voltage battery V1 is referred to as an "H side".

One end of the low-voltage battery V2 is connected to one L-side end of the DC-DC converter 100, and the other end of the low-voltage battery V2 is connected to the other L-side end of the DC-DC converter 100. One end of auxiliary equipment 400 such as an air conditioner is connected to the one L-side end of the DC-DC converter 100 and the one end of the low-voltage battery V2, and the other end of the auxiliary equipment 400 is connected to the other L-side end of the DC-DC converter 100 and the other end of the low-voltage battery V2. One end of HV equipment 300 is connected to one H-side end of the DC-DC converter 100 and one end of the high-voltage battery V1, and the other end of the HV equipment 300 is connected to the other H-side end of the DC-DC converter 100 and the other end of the high-voltage battery V1. One end of the high-voltage battery V1 is connected to the one H-side end of the DC-DC converter 100, and the other end of the high-voltage battery V1 is connected to the other H-side end of the DC-DC converter 100.

The DC-DC converter 100, the HV equipment 300, and the auxiliary equipment 400 are connected to the vehicle power supply control unit 200. The vehicle power supply control unit 200 controls operation of these pieces of equipment, a power transmission direction, an amount of power, and the like of power exchanged between these pieces of equipment and the high-voltage battery V1 and the low-voltage battery V2.

(Basic Configuration of DC-DC Converter 100)

Figure 2:
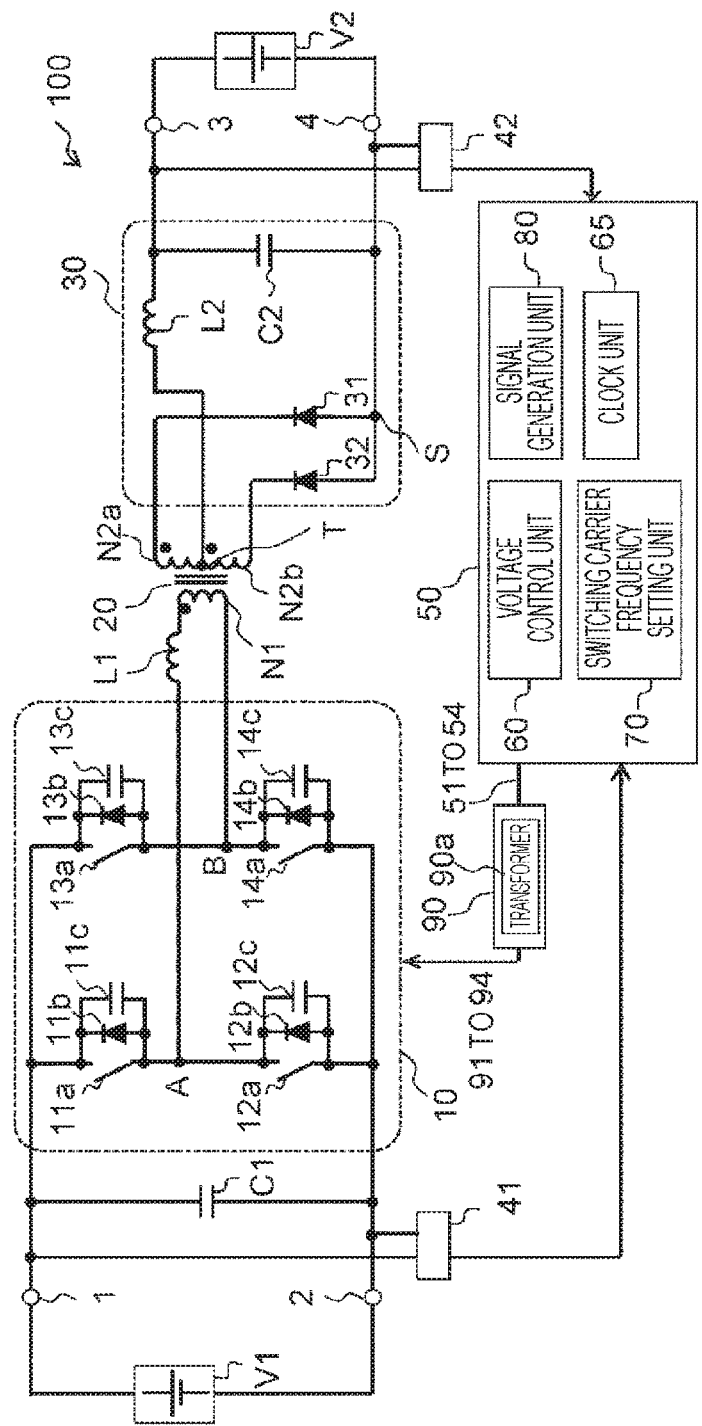
FIG. 2 illustrates a basic circuit configuration of a DC-DC converter according to a first embodiment of the present invention.

FIG. 2 illustrates a basic circuit configuration of the DC-DC converter 100 according to the first embodiment of the present invention. As illustrated in FIG. 2, the DC-DC converter 100 of the present embodiment includes a switching circuit 10, a transformer 20, and an output circuit 30 and is connected to a control circuit 50 via a gate driver 90.

The switching circuit 10 is connected to the high-voltage battery V1 via a positive input terminal 1 and a negative input terminal 2. The switching circuit 10 includes switch elements 11a to 14a that are bridge-connected, and converts DC power supplied from the high-voltage battery V1 into high-frequency AC power by causing the switch elements 11a to 14a to switch on and off and supplies the high-frequency AC power to a primary side of the transformer 20.

The transformer 20 is for insulation between the primary side and a secondary side and performs voltage conversion of AC power between the primary side and the secondary side so that AC power of a voltage lower (or higher) than the AC power generated by the switching circuit 10 is supplied to the output circuit 30.

The output circuit 30 is connected to the low-voltage battery V2 via a positive output terminal 3 and a negative output terminal 4. The output circuit 30 includes diodes 31 and 32, and rectifies and converts the AC power subjected to the voltage conversion by the transformer 20 into DC power by using the diodes 31 and 32 and supplies the DC power to the low-voltage battery V2.

The control circuit 50 is provided, for example, in the vehicle power supply control unit 200 illustrated in FIG. 1 and generates and supplies output signals 51 to 54 for controlling the switching operations of the switch elements 11a to 14a in the switching circuit 10, respectively.

The gate driver 90 converts the output signals 51 to 54 supplied from the control circuit 50 into drive signals 91 to 94 for driving the switch elements 11a to 14a, respectively, and supplies the drive signals 91 to 94 to the switching circuit 10. The gate driver 90 includes an insulating transformer 90a for insulation between the switching circuit 10 and the control circuit 50.

Configurations of the switching circuit 10, the transformer 20, and the output circuit 30 included in the DC-DC converter 100 and details of the control circuit 50 will be described below.

(Switching circuit 10)

The switching circuit 10 functions to convert DC power supplied from the high-voltage battery V1 via the positive input terminal 1 and the negative input terminal 2 into high-frequency AC power under the control of the control circuit 50 and supply the high-frequency AC power to a primary winding N1 of the transformer 20. Between the positive input terminal 1 and the negative input terminal 2, a voltage detector 41 and a smoothing capacitor C1 are connected in parallel with the high-voltage battery V1. The voltage detector 41 detects the voltage of the DC power supplied to the switching circuit 10 and supplies the detected value to the control circuit 50 as an input voltage Vin.

The switching circuit 10 is configured such that the four switch elements 11a to 14a are full-bridge connected. That is, between the positive input terminal 1 and the negative input terminal 2, a series circuit (hereinafter referred to as a "first leg") made up of the two switch elements 11a and 12a, and a series circuit (hereinafter referred to as a "second leg") made up of the two switch elements 13a and 14a are connected. A connection point A between the switch element 11a and the switch element 12a in the first leg is connected to one end of the primary winding N1 of the transformer 20, and a connection point B between the switch element 13a and the switch element 14a in the second leg is connected to the other end of the primary winding N1 of the transformer 20. Note that the switch elements 11a to 14a can be any elements that can switch on and off, and a preferable example of such an element is a field effect transistor (FET).

Diodes 11b to 14b for flywheels and capacitors 11c to 14c are connected in parallel to the switch elements 11a to 14a, respectively. These diodes 11b to 14b and capacitors 11c to 14c may be elements different from the switch elements 11a to 14a or may be parasitic components of the switch elements 11a to 14a. Alternatively, these diodes 11b to 14b and capacitors 11c to 14c may be elements different from the switch elements 11a to 14a and parasitic components of the switch elements 11a to 14a.

In the DC-DC converter 100 of the present embodiment, a phase shift control method, which is a driving method capable of reducing switching loss, is used as a method for controlling the switching circuit 10. According to the phase shift control method, an on/off phase difference between the switch element 11a on an upper side in the first leg and the switch element 14a on a lower side in the second leg among the four switch elements 11a to 14a that constitute the full-bridge type switching circuit 10 is controlled in accordance with an output voltage of the DC-DC converter 100.

Similarly, an on/off phase difference between the switch element 12a on a lower side in the first leg and the switch element 13a on an upper side in the second leg is controlled in accordance with the output voltage of the DC-DC converter 100. Thus, a period during which the switch element 11a and the switch element 14a are simultaneously on and a period during which the switch element 12a and the switch element 13a are simultaneously on are adjusted in accordance with the output voltage. The power transmitted from the switching circuit 10 (the primary side of the transformer 20) to the output circuit 30 (the secondary side of the transformer 20) is determined by the period during which the switch element 11a and the switch element 14a are simultaneously on and the period during which the switch element 12a and the switch element 13a are simultaneously on. Therefore, by controlling the phase differences as described above, the output voltage of the DC-DC converter 100 can be stabilized at a desired value. In the following description, it is assumed that the period during which the switch element 11a and the switch element 14a are simultaneously on and the period during which the switch element 12a and the switch element 13a are simultaneously on have the same length. A ratio of the lengths of these periods in one cycle is sometimes called a duty ratio.

(Transformer 20)

The transformer 20 functions to perform voltage conversion of AC power generated by the switching circuit 10 and supplies the AC power after the voltage conversion to the output circuit 30. The transformer 20 includes the primary winding N1 connected to the switching circuit 10 and a secondary winding N2 connected to the output circuit 30. The transformer 20 has a center-tapped configuration to realize a full-wave rectifier circuit in combination with the output circuit 30, and the secondary winding N2 is divided into two secondary windings N2a and N2b at a middle thereof. A ratio of the number of turns of the primary winding N1 and the number of turns of the secondary winding N2a or N2b (N1/N2a or N1/N2b) is set in accordance with a voltage range of the input voltage Vin applied across the positive input terminal 1 and the negative input terminal 2 and a voltage range of an output voltage Vout to be supplied across the positive output terminal 3 and the negative output terminal 4.

The transformer 20 has a resonant inductor L1 that is in series with the primary winding N1. The resonant inductor L1 and capacitance components of the capacitors 11c to 14c connected in parallel to the switch elements 11a to 14a in the switching circuit 10, respectively, form a resonant circuit that reduces switching loss that occurs in the switching circuit 10. In a case where a value of the resonant inductor L1 in the transformer 20 is small, an inductance value of the resonant circuit may be increased by connecting another inductor in series with the resonant inductor L1.

One end of the primary winding N1 is connected to the connection point A, which is a midpoint of the first leg in the switching circuit 10, via the resonant inductor L1. The other end of the primary winding N1 is connected to the connection point B, which is a midpoint of the second leg in the switching circuit 10. A neutral point T, which is a connection point between the secondary winding N2a and the secondary winding N2b, and both ends of the secondary winding N2 are connected to the output circuit 30.

(Output Circuit 30)

The output circuit 30 functions to convert AC power appearing in the secondary windings N2a and N2b into DC power by smoothing and rectifying the AC power in accordance with AC power flowing through the primary winding N1 of the transformer 20 and supply the DC power to the low-voltage battery V2 via the positive output terminal 3 and the negative output terminal 4. Between the positive output terminal 3 and the negative output terminal 4, a voltage detector 42 is connected in parallel with the low-voltage battery V2. The voltage detector 42 detects a voltage of DC power supplied from the output circuit 30 and supplies the detected value to the control circuit 50 as an output voltage Vout.

The output circuit 30 has two diodes 31 and 32 whose anodes are connected to each other at a rectification connection point S, a smoothing coil L2, and a capacitor C2. The diode 31 is connected between one end of the secondary winding N2a of the transformer 20 and the rectification connection point S, and the diode 32 is connected between one end of the secondary winding N2b of the transformer 20 and the rectification connection point S. The smoothing coil L2 is connected between the neutral point T, which is the other end of the secondary winding N2a and the other end of the secondary winding N2b of the transformer 20, and the positive output terminal 3, and the capacitor C2 is connected between the positive output terminal 3 and the negative output terminal 4.

In the output circuit 30 having the above circuit configuration, the diodes 31 and 32 constitute a rectifier circuit that rectifies AC power supplied from the secondary windings N2a and N2b of the transformer 20 and converts the AC power into DC power. The smoothing coil L2 and the capacitor C2 constitute a smoothing circuit for smoothing a rectified output generated at the neutral point T. By replacing the diodes 31 and 32 with switch elements such as FETs, a synchronous rectification operation, which is a known technique, may be performed to further reduce conduction loss.

(Control Circuit 50)

The control circuit 50 is a circuit that controls operation of the switch elements 11a to 14a of the switching circuit 10 so that the output voltage Vout of the DC-DC converter 100 becomes a predetermined voltage target value. As illustrated in FIG. 2, the control circuit 50 includes a voltage control unit 60, a switching carrier frequency setting unit 70, a signal generation unit 80, and a clock unit 65.

The voltage control unit 60 calculates a duty ratio during switching operation of the switch elements 11a to 14a in the switching circuit 10. In the DC-DC converter 100, the output voltage Vout of the DC power supplied from the output circuit 30 is controlled in accordance with a value of the duty ratio.

The switching carrier frequency setting unit 70 sets a switching carrier frequency according to a drive frequency during switching operation of the switch elements 11a to 14a in the switching circuit 10. In the DC-DC converter 100, the switch elements 11a to 14a are driven at a drive frequency corresponding to the switching carrier frequency.

The signal generation unit 80 generates output signals 51 to 54 based on the duty ratio calculated by the voltage control unit 60 and the switching carrier frequency set by the switching carrier frequency setting unit 70. The output signals 51 to 54 generated by the signal generation unit 80 are supplied from the control circuit 50 to the gate driver 90 and are converted into drive signals 91 to 94 in the gate driver 90, respectively. The drive signals 91 to 94 are supplied to respective gate terminals of the switch elements 11a to 14a in the switching circuit 10 and drive the switch elements 11a to 14a at operation timings according to the duty ratio and the switching carrier frequency used for generation of the output signals 51 to 54. Thus, the operation of the switching circuit 10 is controlled by the control circuit 50.

The clock unit 65 has two counters that are counted up every fixed clock, and controls execution timings of the voltage control unit 60 and the switching carrier frequency setting unit 70 based on the counted values of these counters.

Figure 3:
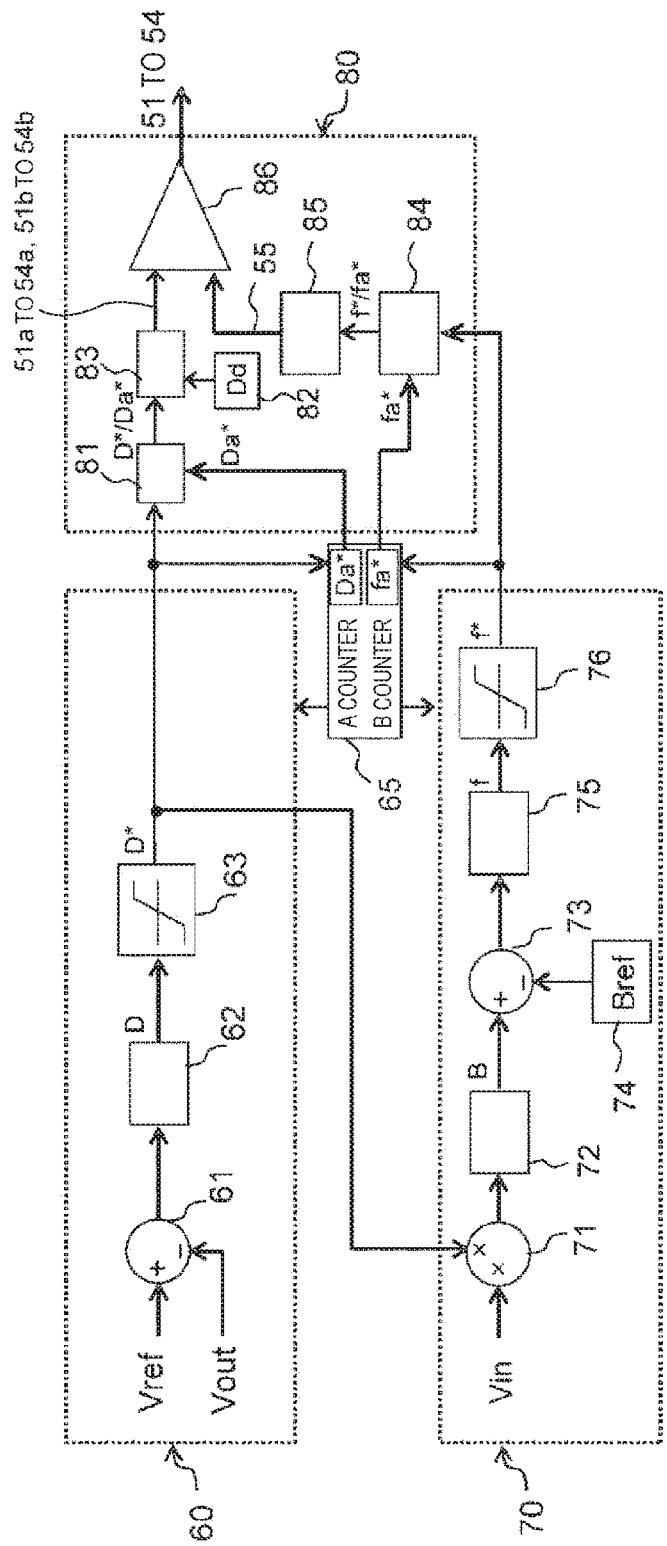
FIG. 3 illustrates a configuration of a control circuit according to the first embodiment of the present invention.

FIG. 3 illustrates a configuration of the control circuit 50 according to the first embodiment of the present invention. Details of the voltage control unit 60, the switching carrier frequency setting unit 70, the signal generation unit 80, and the clock unit 65 of the control circuit 50 according to the present embodiment will be described with reference to FIG. 3.

(Voltage Control Unit 60)

The voltage control unit 60 includes a subtraction unit 61, a PI control unit 62, and a duty limiting unit 63. The subtraction unit 61 calculates a difference between a voltage command value Vref, which is a preset target value of an output voltage, and the output voltage Vout detected by the voltage detector 42, and supplies the difference to the PI control unit 62. The PI control unit 62 performs a PI operation on the difference found by the subtraction unit 61 to perform PI control (proportional-integral control) so that the difference approaches 0, and thus finds a duty value D, which is a value of a duty ratio to the switch elements 11a to 14a of the switching circuit 10.

The duty limiting unit 63 sets predetermined lower limit and upper limit on the duty value D found by the PI control unit 62 and finds a duty instruction value D* that is within a range from the lower limit to the upper limit. The duty instruction value D* found by the duty limiting unit 63 is supplied from the voltage control unit 60 to the switching carrier frequency setting unit 70, the signal generation unit 80, and the clock unit 65.

Note that the duty instruction value D* supplied from the voltage control unit 60 satisfies the relationship expressed by the following formula (1), where the upper limit and the lower limit set by the duty limiting unit 63 are a maximum duty value Dmax and a minimum duty value Dmin, respectively.

$$D{\min} \leq D^* \leq D{\max} \quad (1)$$

(Switching Carrier Frequency Setting Unit 70)

The switching carrier frequency setting unit 70 includes a multiplying unit 71, a proportional unit 72, a subtraction unit 73, a magnetic flux density command value setting unit 74, a PI control unit 75, and a frequency limiting unit 76. The multiplying unit 71 multiplies the duty instruction value D* supplied from the duty limiting unit 63 of the voltage control unit 60 and the input voltage Vin detected by the voltage detector 41 and supplies the multiplied value to the proportional unit 72. The proportional unit 72 converts the multiplied value into a magnetic flux density value B of the transformer 20 by multiplying the multiplied value found by the multiplying unit 71 by a predetermined proportional constant. The subtraction unit 73 calculates a difference between the magnetic flux density value B found by the proportional unit 72 and a magnetic flux density command value Bref, which is a target value of a magnetic flux density preset based on a saturation magnetic flux density of the transformer 20 by the magnetic flux density command value setting unit 74, and supplies the difference to the PI control unit 75. The PI control unit 75 performs a PI operation on the difference obtained by the subtraction unit 73 to perform PI control (proportional-integral control) so that the difference approaches 0, and thus finds a switching carrier frequency f according to a drive frequency of the switching circuit 10.

The frequency limiting unit 76 sets predetermined lower limit and upper limit on the switching carrier frequency f found by the PI control unit 75 and finds a switching carrier frequency setting value f* that is within a range from the lower limit to the upper limit. The switching carrier frequency setting value f* found by the frequency limiting unit 76 is supplied from the switching carrier frequency setting unit 70 to the signal generation unit 80 and the clock unit 65.

Note that the switching carrier frequency setting value f* supplied from the switching carrier frequency setting unit 70 satisfies the relationship expressed by the following formula (2) where the upper limit and the lower limit set by the frequency limiting unit 76 are a maximum switching carrier frequency fmax and a minimum switching carrier frequency fmin, respectively.

$$f{\min} \leq f^* \leq f{\max} \quad (2)$$

The switching carrier frequency setting unit 70 supplies the switching carrier frequency setting value f* obtained as described above to the signal generation unit 80. This makes it possible to set a switching carrier frequency for generation of the output signals 51 to 54 by the signal generation unit 80 so that the drive frequency of the switching circuit 10 is lowered in a case where the magnetic flux density value B of the transformer 20 is smaller than the magnetic flux density command value Bref, whereas the drive frequency of the switching circuit 10 is increased in a case where the magnetic flux density value B of the transformer 20 is larger than the magnetic flux density command value Bref.

(Clock Unit 65)

The clock unit 65 has an A counter and a B counter. The A counter is a counter used to control an execution timing of the voltage control unit 60 and is counted up every fixed clock. The B counter is a counter used to control an execution timing of the switching carrier frequency setting unit 70 and is counted up every fixed clock, like the A counter.

The duty instruction value D* supplied from the voltage control unit 60 to the clock unit 65 is stored in the clock unit 65 as a previous duty instruction value Da*. In a case where the value of the A counter is less than a predetermined threshold, the clock unit 65 supplies the stored previous duty instruction value Da* to the signal generation unit 80. In a case where the value of the A counter becomes equal to or more than the predetermined threshold, the clock unit 65 gives an execution command to the voltage control unit 60 and causes the voltage control unit 60 to calculate the duty instruction value D*. As a result, a new duty instruction value D* is calculated by the voltage control unit 60 and supplied to the signal generation unit 80, and the previous duty instruction value Da* stored in the clock unit 65 is updated.

The switching carrier frequency setting value f* supplied from the switching carrier frequency setting unit 70 to the clock unit 65 is stored in the clock unit 65 as a previous switching carrier frequency setting value fa*. In a case where the value of the B counter is less than a predetermined threshold, the clock unit 65 supplies the stored previous switching carrier frequency setting value fa* to the signal generation unit 80. When the value of the B counter becomes equal to or more than the predetermined threshold, the clock unit 65 gives an execution command to the switching carrier frequency setting unit 70 and causes the switching carrier frequency setting unit 70 to calculate a switching carrier frequency setting value f*. As a result, a new switching carrier frequency setting value f* is calculated by the switching carrier frequency setting unit 70 and supplied to the signal generation unit 80, and the previous switching carrier frequency setting value fa* stored in the clock unit 65 is updated.

As described above, the clock unit 65 supplies the previous duty instruction value Da* or an execution command to the voltage control unit 60 in accordance with the value of the A counter, and supplies the previous switching carrier frequency setting value fa* or an execution command to the switching carrier frequency setting unit 70 in accordance with the value of the B counter. In this way, execution timings of the voltage control unit 60 and the switching carrier frequency setting unit 70 can be controlled. Note that the threshold of the A counter and the threshold of the B counter may be the same value or may be different values.

(Signal Generation Unit 80)

The signal generation unit 80 includes a calculation determination unit 81, a dead time setting unit 82, a threshold setting unit 83, a calculation determination unit 84, a carrier signal generation unit 85, and a comparator 86. The calculation determination unit 81 supplies the input duty instruction value D* to the threshold setting unit 83 in a case where the voltage control unit 60 calculates the duty instruction value D*, and the calculation determination unit 81 supplies an input previous duty instruction value Da* to the threshold setting unit 83 in a case where the voltage control unit 60 does not calculate the duty instruction value D* and the previous duty instruction value Da* is supplied from the clock unit 65.

The dead time setting unit 82 supplies a dead time setting value Dd during switching operation of the switch elements 11a to 14a to the threshold setting unit 83. The threshold setting unit 83 sets on-timing thresholds 51a to 54a and off-timing thresholds 51b to 54b for determining on/off timings of the switch elements 11a to 14a based on the duty instruction value D* or the previous duty instruction value Da* supplied from the calculation determination unit 81 and the dead time setting value Dd supplied from the dead time setting unit 82 and supplies to the comparator 86. For example, assume that the dead time setting value Dd for the first leg is Dd 12 and the dead time setting value Dd for the second leg is Dd 34, the on-timing thresholds 51a to 54a and the off-timing thresholds 51b to 54b are set as follows. In the following, "Cmax" indicates a maximum value of the carrier signal generated by the carrier signal generation unit 85.

| On-timing thresholds | Off-timing thresholds |
|---|---|
| 51a: Cmax | 51b: 0.5Cmax − Dd_12 |
| 52a: 0.5Cmax | 52b: Cmax − Dd_12 |
| 53a: D* + Dd_34 | 53b: D* + 0.5Cmax |
| 54a: D* + 0.5Cmax + Dd_34 | 54b: D* |

Although an example in which the duty instruction value D* is supplied to the threshold setting unit 83 is illustrated above, in a case where the previous duty instruction value Da* is supplied, the on-timing thresholds 51a to 54a and the off-timing thresholds 51b to 54b can be similarly set by replacing D* with Da*.

In a case where the switching carrier frequency setting unit 70 calculates the switching carrier frequency setting value f*, the calculation determination unit 84 supplies the input switching carrier frequency setting value f* to the carrier signal generation unit 85, whereas in a case where the switching carrier frequency setting unit 70 does not calculate the switching carrier frequency setting value f* and the previous switching carrier frequency setting value fa* is supplied from the clock unit 65, the input previous switching carrier frequency setting value fa* is supplied to the carrier signal generation unit 85. Based on the switching carrier frequency setting value f* or the previous switching carrier frequency setting value fa* supplied from the calculation determination unit 84, the carrier signal generation unit 85 generates a carrier signal 55 having a frequency corresponding to this setting value and supplies the carrier signal 55 to the comparator 86. Note that the carrier signal 55 generated by the carrier signal generation unit 85 is a periodic signal such as a triangular wave that continuously changes from 0 to a predetermined maximum value Cmax and repeatedly changes in a cycle corresponding to the switching carrier frequency setting value f* or the previous switching carrier frequency setting value fa*.

The comparator 86 compares the carrier signal 55 supplied from the carrier signal generation unit 85 with the on-timing thresholds 51a to 54a and the off-timing thresholds 51b to 54b supplied from the threshold setting unit 83 and thereby generates output signals 51 to 54 through pulse modulation according to the duty instruction value D* or the previous duty instruction value Da*. By supplying the output signals 51 to 54 generated by the comparator 86 to the gate driver 90, the control circuit 50 controls on/off of the switch elements 11a to 14a of the switching circuit 10.

Figure 4:
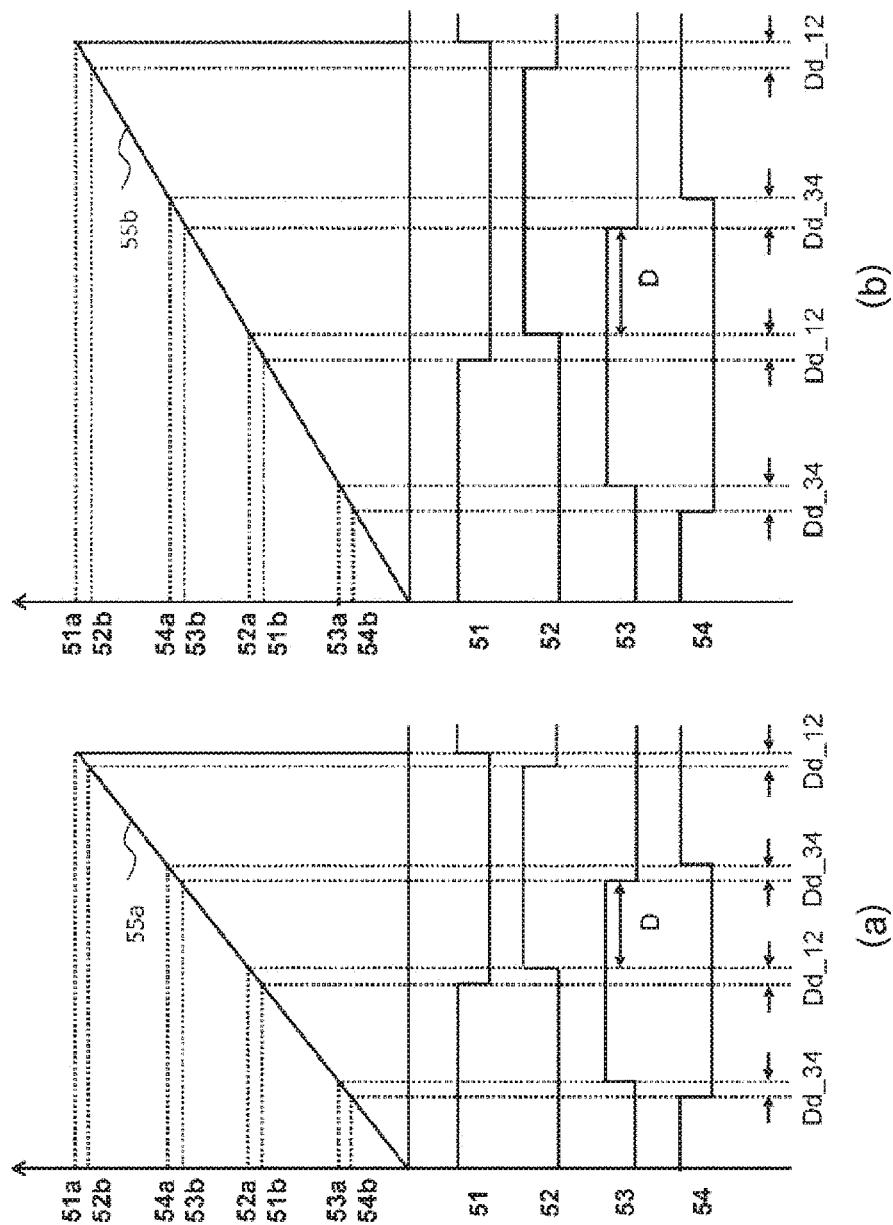
FIG. 4 is a diagram for explaining operation of a comparator.

FIG. 4 is a diagram for explaining the operation of the comparator 86. FIG. 4(a) illustrates an example in which the frequency of the carrier signal 55 is high (the cycle is short). In FIG. 4(a), the waveform of the carrier signal 55 is indicated by reference numeral 55a. FIG. 4(b) illustrates an example where the frequency of the carrier signal 55 is low (the cycle is long). In FIG. 4(b), the waveform of the carrier signal 55 is indicated by reference numeral 55b. As illustrated in FIGS. 4(a) and 4(b), the slope of the carrier signal 55 changes depending on the switching carrier frequency setting value f* or the previous switching carrier frequency setting value fa* supplied from the calculation determination unit 84.

The comparator 86 compares the carrier signal 55 with the on-timing thresholds 51a to 54a and the off-timing thresholds 51b to 54b. As a result, as illustrated in FIGS. 4(a) and 4(b), the output signals 51 to 54 are switched from off (L level) to on (H level) when the value of the carrier signal 55 exceeds the on-timing thresholds 51a to 54a. The output signals 51 to 54 are switched from on (H level) to off (L level) when the value of the carrier signal 55 exceeds the off-timing thresholds 51b to 54b. Specifically, for example, in a case where the on-timing thresholds 51a to 54a and the off-timing thresholds 51b to 54b are set to the values described above, on/off of the output signals 51 to 54 is sequentially switched as follows.

(1) The output signal 54 is turned off when the value of the carrier signal 55 reaches the off-timing threshold signal 54b.

(2) The output signal 53 is turned on when the value of the carrier signal 55 reaches the on-timing threshold signal 53a.

(3) The output signal 51 is turned off when the value of the carrier signal 55 reaches the on-timing threshold signal 51b.

(4) The output signal 52 is turned on when the value of the carrier signal 55 reaches the on-timing threshold signal 52a.

(5) The output signal 53 is turned off when the value of the carrier signal 55 reaches the off-timing threshold signal 53b.

(6) The output signal 54 is turned on when the value of the carrier signal 55 reaches the on-timing threshold signal 54a.

(7) The output signal 52 is turned off when the value of the carrier signal 55 reaches the on-timing threshold signal 52b.

(8) The output signal 51 is turned on when the value of the carrier signal 55 reaches the on-timing threshold signal 51a.

The signal generation unit 80 generates the output signals 51 to 54 for setting the on/off timings of the switch elements 11a to 14a as described above.

(Control Flow)

Figure 5:
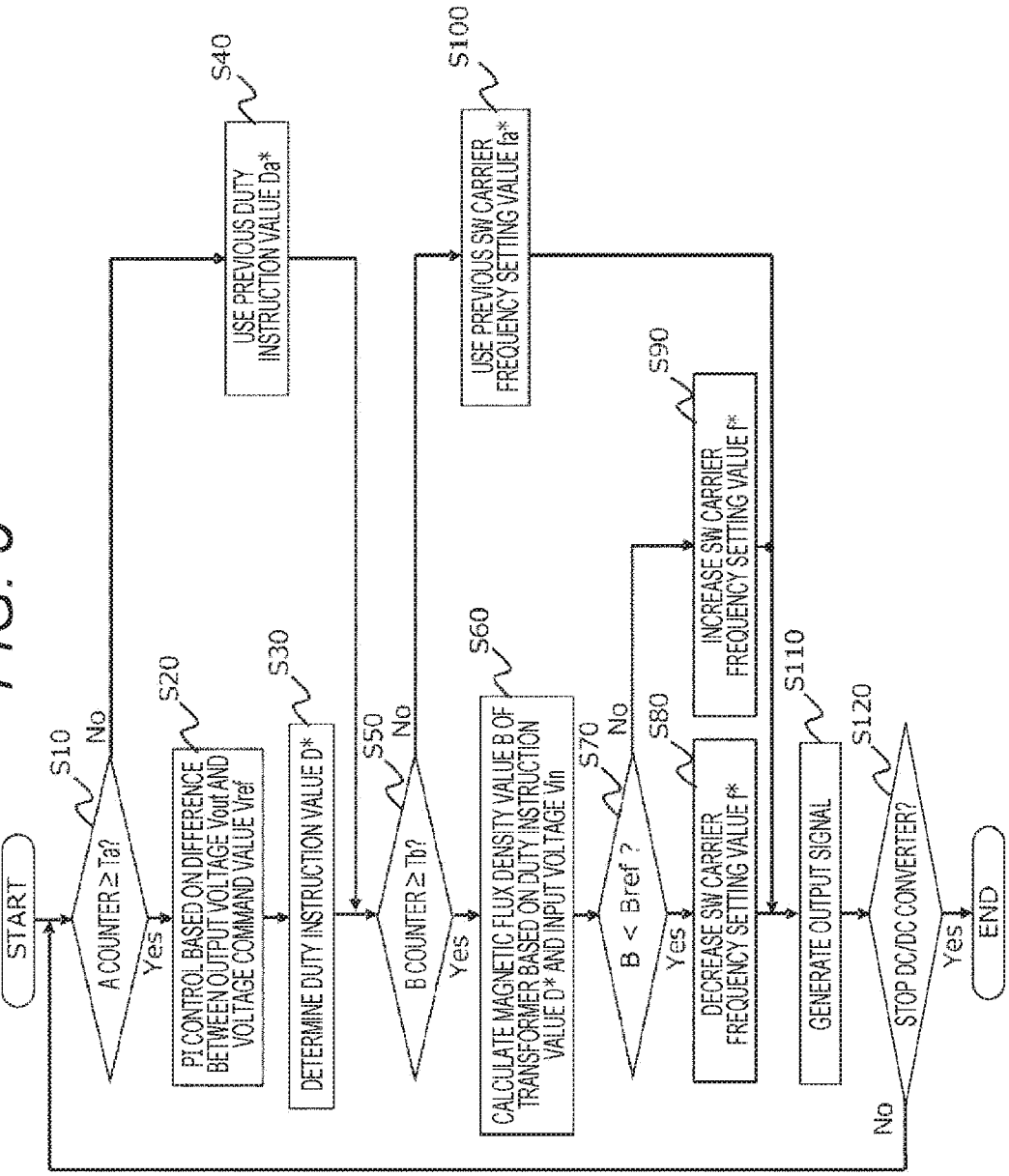
FIG. 5 is a control flow chart of a control circuit.

FIG. 5 is a control flowchart of the control circuit 50. The operation of the control circuit 50 described above will be described below with reference to the control flowchart of FIG. 5.

In step S10, the control circuit 50 determines whether or not the value of the A counter of the clock unit 65 is equal to or greater than a predetermined threshold Ta. In a case where the value of the A counter is equal to or greater than the threshold Ta, the processing proceeds to step S20. Meanwhile, in a case where the value of the A counter is less than the threshold Ta, the processing proceeds to step S40.

In step S20, the control circuit 50 causes the subtraction unit 61 of the voltage control unit 60 to find a difference between the output voltage Vout detected by the voltage detector 42 and the voltage command value Vref and causes the PI control unit 62 to perform PI control based on the difference. Then, in step S30, the control circuit 50 determines a duty instruction value D* by causing the duty limiting unit 63 to set a lower limit and an upper limit on the duty value D found by the PI control in step S20. After step S30, the control circuit 50 supplies the determined duty instruction value D* to the switching carrier frequency setting unit 70, the signal generation unit 80, and the clock unit 65, and the processing proceeds to step S50.

In step S40, the control circuit 50 supplies the previous duty instruction value Da* stored in the clock unit 65 to the signal generation unit 80, and the processing proceeds to step S50. In a case where the previous duty instruction value Da* is not stored in the clock unit 65, for example, in an initial state immediately after activation of the control circuit 50, a predetermined initial value (for example, 0) is supplied as the previous duty instruction value Da*.

In step S50, the control circuit 50 determines whether or not the value of the B counter of the clock unit 65 is equal to or greater than a predetermined threshold Tb. In a case where the value of the B counter is equal to or greater than the threshold Tb, the processing proceeds to step S60, whereas in a case where the value of the B counter is less than the threshold Tb, the processing proceeds to step S100.

In step S60, the control circuit 50 causes the multiplying unit 71 of the switching carrier frequency setting unit 70 to multiply the duty instruction value D* supplied from the voltage control unit 60 by the input voltage Vin detected by the voltage detector 41 and causes the proportional unit 72 to convert the multiplexed value into a magnetic flux density value B of the transformer 20. Then, in steps S70 to S90, PI control is performed so that a difference between the magnetic flux density value B calculated in step S60 and the magnetic flux density command value Bref approaches 0. Specifically, a switching carrier frequency f is found by causing the subtraction unit 73 to find the difference between the magnetic flux density value B and the magnetic flux density command value Bref and causing the PI control unit 75 to perform PI control based on the difference. Then, the switching carrier frequency setting value f* is determined by causing the frequency limiting unit 76 to set a lower limit and an upper limit on the obtained switching carrier frequency f. In a case where B<Bref (Yes in S70), the switching carrier frequency setting value f* is decreased (S80), whereas in a case where B≥Bref (No in S70), the switching carrier frequency setting value f* is increased (S90). After step S80 or S90, the control circuit 50 supplies the determined switching carrier frequency setting value f* to the signal generation unit 80 and the clock unit 65, and the processing proceeds to step S110.

In step S100, the control circuit 50 supplies the previous switching carrier frequency setting value fa* stored in the clock unit 65 to the signal generation unit 80, and the processing proceeds to step S110. In a case where the previous switching carrier frequency setting value fa* is not stored in the clock unit 65, for example, in an initial state immediately after activation of the control circuit 50, a predetermined initial value (for example, the maximum switching carrier frequency fmax) is supplied as the previous switching carrier frequency setting value fa*.

In step S110, the control circuit 50 causes the signal generation unit 80 to generate output signals 51 to 54 based on the duty instruction value D* or the previous duty instruction value Da* found in step S30 or S40 and the switching carrier frequency setting value f* or the previous switching carrier frequency setting value fa* found in step S80, S90, or S100. Specifically, the signal generation unit 80 supplies the duty instruction value D* or the previous duty instruction value Da* from the calculation determination unit 81 to the threshold setting unit 83, and the threshold setting unit 83 sets the on-timing thresholds 51a to 54a and the off-timing thresholds 51b to 54b according to the dead time setting value Dd. Furthermore, the switching carrier frequency setting value f* or the previous switching carrier frequency setting value fa* is supplied from the calculation determination unit 84 to the carrier signal generation unit 85, and the carrier signal generation unit 85 generates the carrier signal 55. Then, the comparator 86 generates the output signals 51 to 54 by comparing the carrier signal 55 with the on-timing thresholds 51a to 54a and the off-timing thresholds 51b to 54b. After step S110, the control circuit 50 supplies the generated output signals 51 to 54 to the gate driver 90, and the processing proceeds to step S120.

In step S120, the control circuit 50 determines whether or not to stop the DC-DC converter 100. For example, in a case where a predetermined stop condition such as receipt of a command to stop control of the DC-DC converter 100 from an outside, the control circuit 50 decides to stop the DC-DC converter 100. Thus, the control flow of FIG. 5 ends, and the control circuit 50 stops the operation. Meanwhile, in a case where such a stop condition is not satisfied, the control circuit 50 decides not to stop the DC-DC converter 100 and returns to step S10 to repeat the above processing.

According to the first embodiment of the present invention described above, the following effects are obtained.

(1) The DC-DC converter 100, which is a power conversion device, includes a switching circuit 10 that converts input first DC power into AC power, a transformer 20 that performs voltage conversion of the AC power, and an output circuit 30 that converts the AC power subjected to the voltage conversion by the transformer 20 into second DC power. The control circuit 50 that controls the DC-DC converter 100 calculates a magnetic flux density value B of the transformer 20 and controls a drive frequency of the switching circuit 10 based on the calculated magnetic flux density value B. With this configuration, switching loss of DC-DC converter 100 can be sufficiently reduced.

(2) The control circuit 50 includes a voltage control unit 60 that calculates a duty instruction value D* for controlling an output voltage Vout of the output circuit 30, a switching carrier frequency setting unit 70 that calculates a magnetic flux density value B based on the duty instruction value D* and the input voltage Vin of the switching circuit 10 and sets a switching carrier frequency according to the drive frequency of the switching circuit 10 based on the calculated magnetic flux density value B, and a signal generation unit 80 that generates output signals 51 to 54 for driving the switching circuit 10 based on the duty instruction value D* and the switching carrier frequency and supplies the generated output signals 51 to 54 to the switching circuit 10 via a gate driver 90. With this configuration, the DC-DC converter 100 can be operated at an appropriate drive frequency while preventing magnetic saturation of the transformer 20 with certainty without detecting a current of the transformer 20, and thereby the switching loss can be reduced.

(3) The switching carrier frequency setting unit 70 sets a switching carrier frequency so that the drive frequency of the switching circuit 10 is lowered in a case where the magnetic flux density value B is smaller than a predetermined magnetic flux density command value Bref based on the saturation magnetic flux density of the transformer 20 and so that the drive frequency of the switching circuit 10 is increased in a case where the magnetic flux density value B is larger than the magnetic flux density command value Bref. With this configuration, the DC-DC converter 100 can be operated at an appropriate drive frequency so that the magnetic flux density value B approaches the magnetic flux density command value Bref.

(4) The control circuit 50 further includes a clock unit 65 that controls execution timings of the voltage control unit 60 and the switching carrier frequency setting unit 70. With this configuration, the voltage control unit 60 and the switching carrier frequency setting unit 70 can be operated at appropriate timings.

Second Embodiment

Next, a second embodiment of the present invention will be described. In the present embodiment, an example in which a magnetic flux density command value setting unit 74 of a switching carrier frequency setting unit 70 changes a magnetic flux density command value Bref in accordance with a temperature of a transformer 20 will be described.

Figure 6:
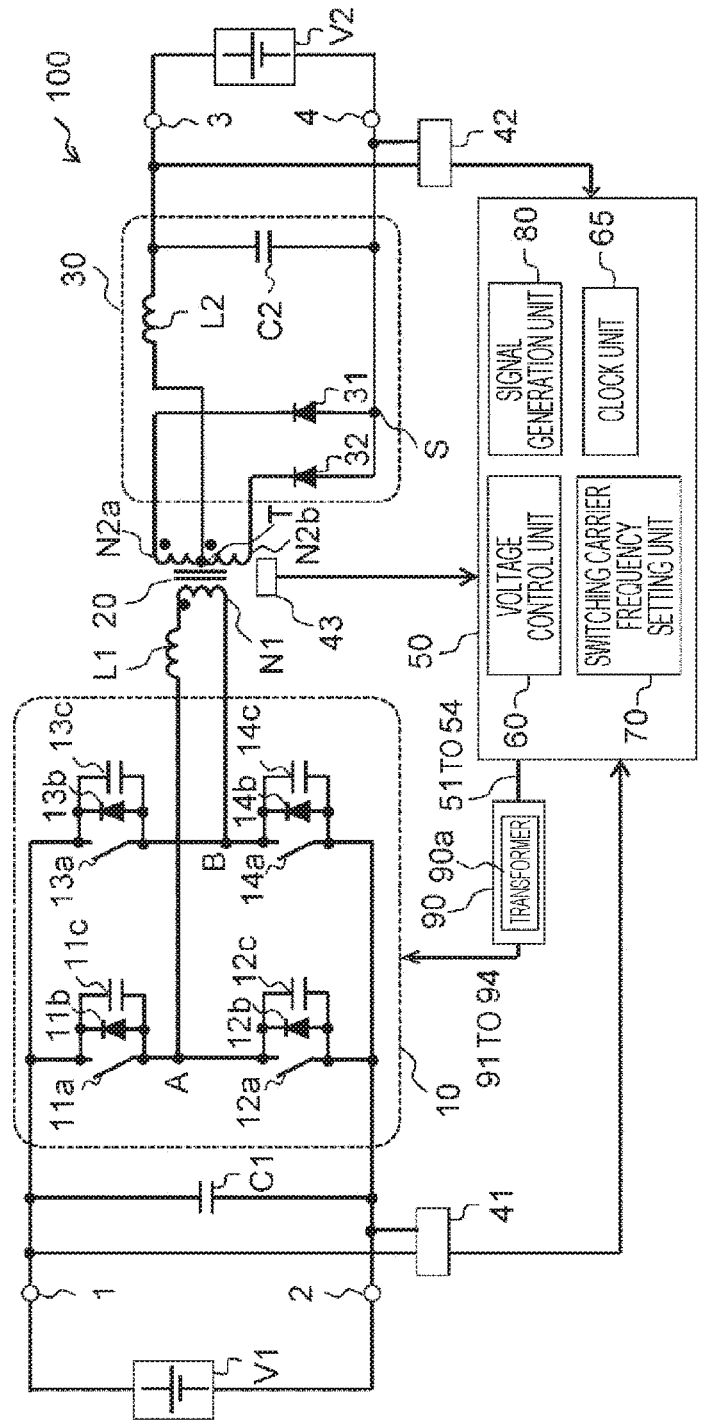
FIG. 6 illustrates a basic circuit configuration of a DC-DC converter according to a second embodiment of the present invention.

FIG. 6 illustrates a basic circuit configuration of a DC-DC converter 100 according to the second embodiment of the present invention. As illustrated in FIG. 6, the DC-DC converter 100 of the present embodiment has a configuration similar to that described in the first embodiment except for that a temperature detector 43 for detecting the temperature of the transformer 20 is provided close to the transformer 20.

In the present embodiment, the temperature detector 43 detects the temperature of the transformer 20 and supplies the detected value to the control circuit 50. The detected value of the transformer temperature supplied from the temperature detector 43 is supplied to the magnetic flux density command value setting unit 74 of the switching carrier frequency setting unit 70 in the control circuit 50. The magnetic flux density command value setting unit 74 changes the magnetic flux density command value Bref to be supplied to a subtraction unit 73 based on the supplied detection value of the transformer temperature.

FIG. 7 illustrates an example of a relationship between the transformer temperature and the magnetic flux density command value Bref. FIG. 7(a) illustrates an example in which the magnetic flux density command value Bref is increased at a constant rate according to rise of the transformer temperature, and the magnetic flux density command value Bref is decreased at a constant rate according to fall of the transformer temperature. FIG. 7(b) illustrates an example in which the magnetic flux density command value Bref is continuously changed in consideration of temperature dependency in a region where the transformer temperature is less than a predetermined value, and the magnetic flux density command value Bref is constant in a region where the transformer temperature is equal to or greater than the predetermined value. Note that the magnetic flux density command value Bref may be changed according to the transformer temperature by using a relationship other than those illustrated in FIG. 7(a) and FIG. 7(b). For example, the magnetic flux density command value Bref may be decreased according to rise of the transformer temperature, and the magnetic flux density command value Bref may be increased according to fall of the transformer temperature. The transformer temperature and the magnetic flux density command value Bref need not be in a proportional relationship nor in a relationship defined by a continuous function.

According to the second embodiment of the present invention described above, the DC-DC converter 100, which is a power conversion device, further includes the temperature detector 43 for detecting the temperature of the transformer 20. In the control circuit 50, the switching carrier frequency setting unit 70 changes the magnetic flux density command value Bref based on the detected value of the temperature of the transformer 20 detected by the temperature detector 43. This produces an effect of providing more accurate control of the DC-DC converter 100 in addition to the effects described in the first embodiment.

Third Embodiment

Next, a third embodiment of the present invention will be described. In the present embodiment, an example in which a magnetic flux density command value setting unit 74 of a switching carrier frequency setting unit 70 changes a magnetic flux density command value Bref in accordance with an output current from a DC-DC converter 100 will be described.

Figure 8:
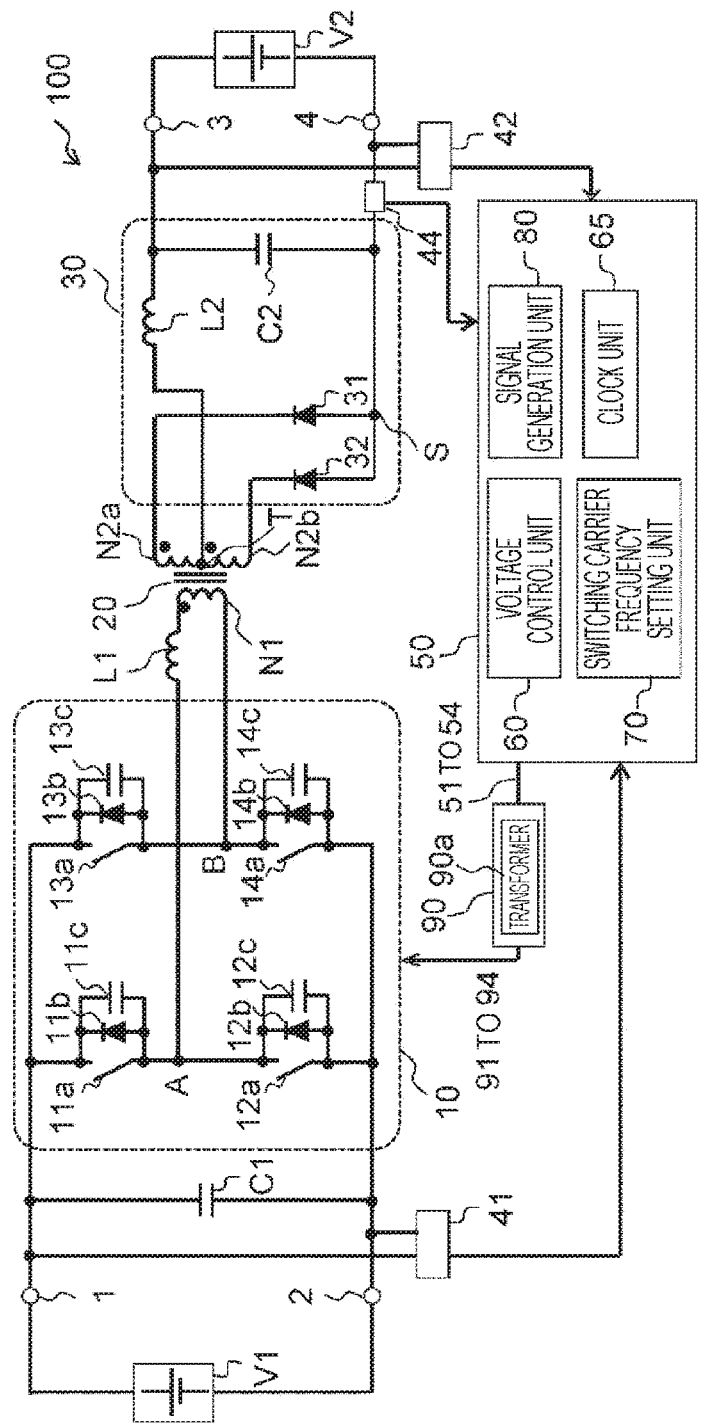
FIG. 8 illustrates a basic circuit configuration of a DC-DC converter according to a third embodiment of the present invention.

FIG. 8 illustrates a basic circuit configuration of a DC-DC converter 100 according to the third embodiment of the present invention. As illustrated in FIG. 8, the DC-DC converter 100 of the present embodiment has a configuration similar to that described in the first embodiment except for that a current detector 44 that detects an output current of the DC-DC converter 100 output from an output circuit 30 to a low-voltage battery V2 is provided between the output circuit 30 and the low-voltage battery V2.

In the present embodiment, the current detector 44 detects an output current from the output circuit 30 and supplies the detected value to the control circuit 50. Although the current detector 44 is connected to a negative output terminal 4 side in FIG. 8, the current detector 44 may be connected to a positive output terminal 3 side. The detected value of the output current supplied from the current detector 44 is supplied to the magnetic flux density command value setting unit 74 of the switching carrier frequency setting unit 70 in the control circuit 50. The magnetic flux density command value setting unit 74 changes a magnetic flux density command value Bref to be supplied to the subtraction unit 73 based on the supplied detected value of the output current.

FIG. 9 illustrates an example of a relationship between the output current and the magnetic flux density command value Bref. FIG. 9(a) illustrates an example in which the magnetic flux density command value Bref is increased at a constant rate according to rise of the output current, and the magnetic flux density command value Bref is decreased at a constant rate according to fall of the output current. FIG. 9(b) illustrates an example in which the magnetic flux density command value Bref is continuously changed in consideration of output current dependency in a region where the output current is less than the predetermined value, and the magnetic flux density command value Bref is constant in a region where the output current is equal to or greater than the predetermined value. Note that the magnetic flux density command value Bref may be changed according to the output current by using a relationship other than those illustrated in FIGS. 9(a) and 9(b). For example, the magnetic flux density command value Bref may be decreased according to rise of the output current, and the magnetic flux density command value Bref may be increased according to fall of the output current. The output current and the magnetic flux density command value Bref need not be in a proportional relationship and need not be in a relationship defined by a continuous function.

According to the third embodiment of the present invention described above, the DC-DC converter 100, which is a power conversion device, further includes the current detector 44 that detects the output current from the output circuit 30. In the control circuit 50, the switching carrier frequency setting unit 70 changes the magnetic flux density command value Bref based on the detected value of the output current detected by the current detector 44. This produces an effect of providing more accurate control of the DC-DC converter 100 in addition to the effects described in the first embodiment, as in the second embodiment.

Fourth Embodiment

Next, a fourth embodiment of the present invention will be described. In the present embodiment, an example in which gain adjustment is performed for PI control performed by a PI control unit 75 of a switching carrier frequency setting unit 70 will be described.

Figure 10:
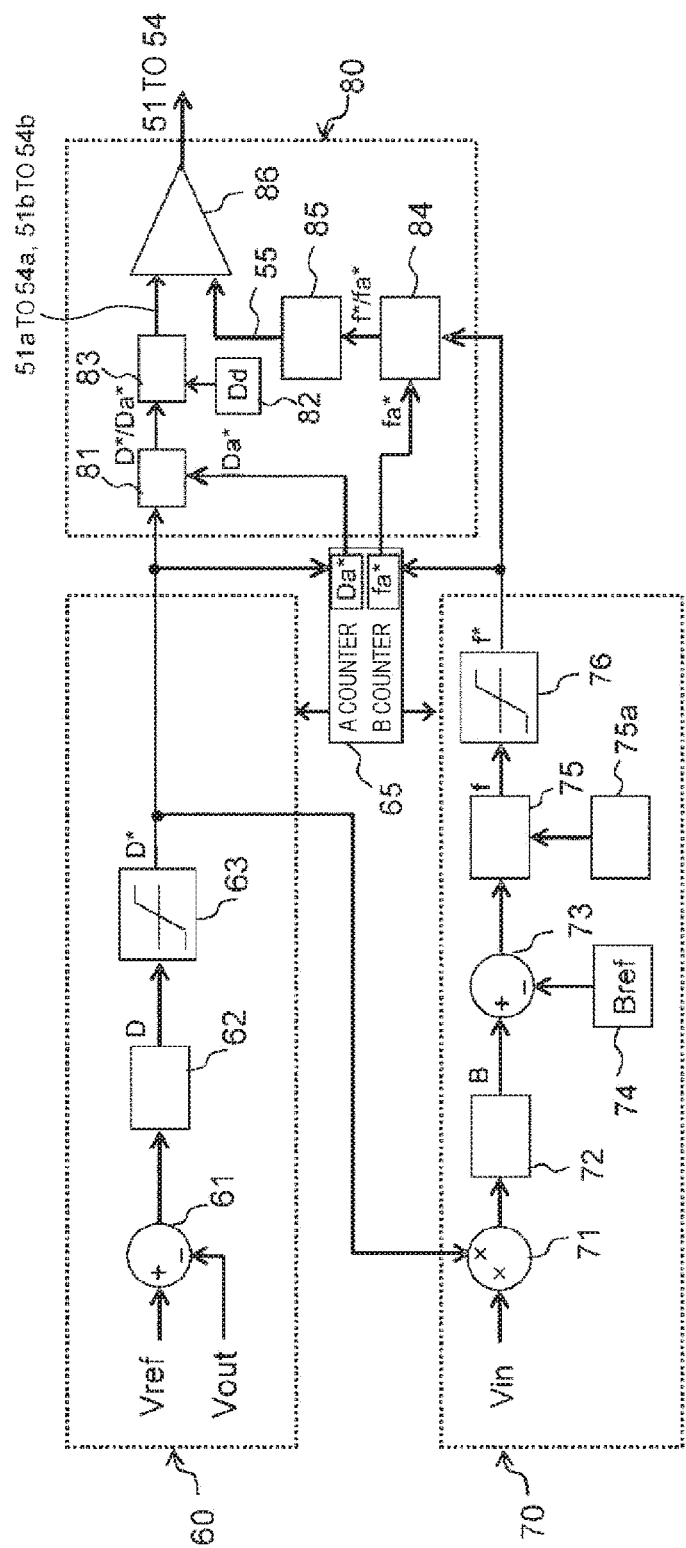
FIG. 10 illustrates a configuration of a control circuit according to a fourth embodiment of the present invention.

FIG. 10 illustrates a configuration of a control circuit 50 according to the fourth embodiment of the present invention. As illustrated in FIG. 10, the control circuit 50 according to the present embodiment has a configuration similar to that described in the first embodiment except for that a switching carrier frequency setting unit 70 further includes a gain adjustment unit 75a connected to the PI control unit 75. The gain adjustment unit 75a will be described below.

(Gain Adjustment Unit 75a)

The PI control unit 75 performs PI control according to a difference between a magnetic flux density command value Bref and a magnetic flux density value B by PI calculation using a predetermined PI control gain. A higher PI control gain results in a faster change of a switching carrier frequency when the magnetic flux density value B approaches the magnetic flux density command value Bref, thereby improving response of the switching circuit 10. Conversely, a lower PI control gain results in a slower change of a switching carrier frequency when the magnetic flux density value B approaches the magnetic flux density command value Bref, thereby decreasing response of the switching circuit 10. In view of this, the control circuit 50 according to the present embodiment adjusts response of the switching circuit 10 by causing the gain adjustment unit 75a to appropriately adjust the PI control gain used in the PI control unit 75.

FIG. 11 illustrates an example of a method for adjusting the PI control gain by the gain adjustment unit 75a. FIG. 11(a) illustrates an example in which the PI control gain is adjusted in accordance with a switching carrier frequency, and FIG. 11(b) illustrates an example in which the PI control gain is adjusted in accordance with an output current from an output circuit 30. The gain adjustment unit 75a can change the PI control gain based on the switching carrier frequency or the output current, as illustrated in, for example, FIGS. 11(a) and 11(b). Note that the PI control gain can also be adjusted by using both the switching carrier frequency and the output current or can be adjusted by using other information.

According to the fourth embodiment of the present invention described above, the switching carrier frequency setting unit 70 has the PI control unit 75 that performs PI control based on the difference between the magnetic flux density value B and the magnetic flux density command value Bref by using a predetermined PI control gain, and the gain adjustment unit 75a changes the PI control gain based on at least one of the switching carrier frequency and the output current from the output circuit 30. This produces an effect of appropriate adjustment of response of the switching circuit 10 while preventing magnetic saturation of the transformer 20 with certainty in addition to the effects described in the first embodiment.

Fifth Embodiment

Next, a fifth embodiment of the present invention will be described. In the present embodiment, a method of determining an upper limit and a lower limit of a switching carrier frequency setting value f* set in a frequency limiting unit 76 of a switching carrier frequency setting unit 70 will be described.

Figure 12:
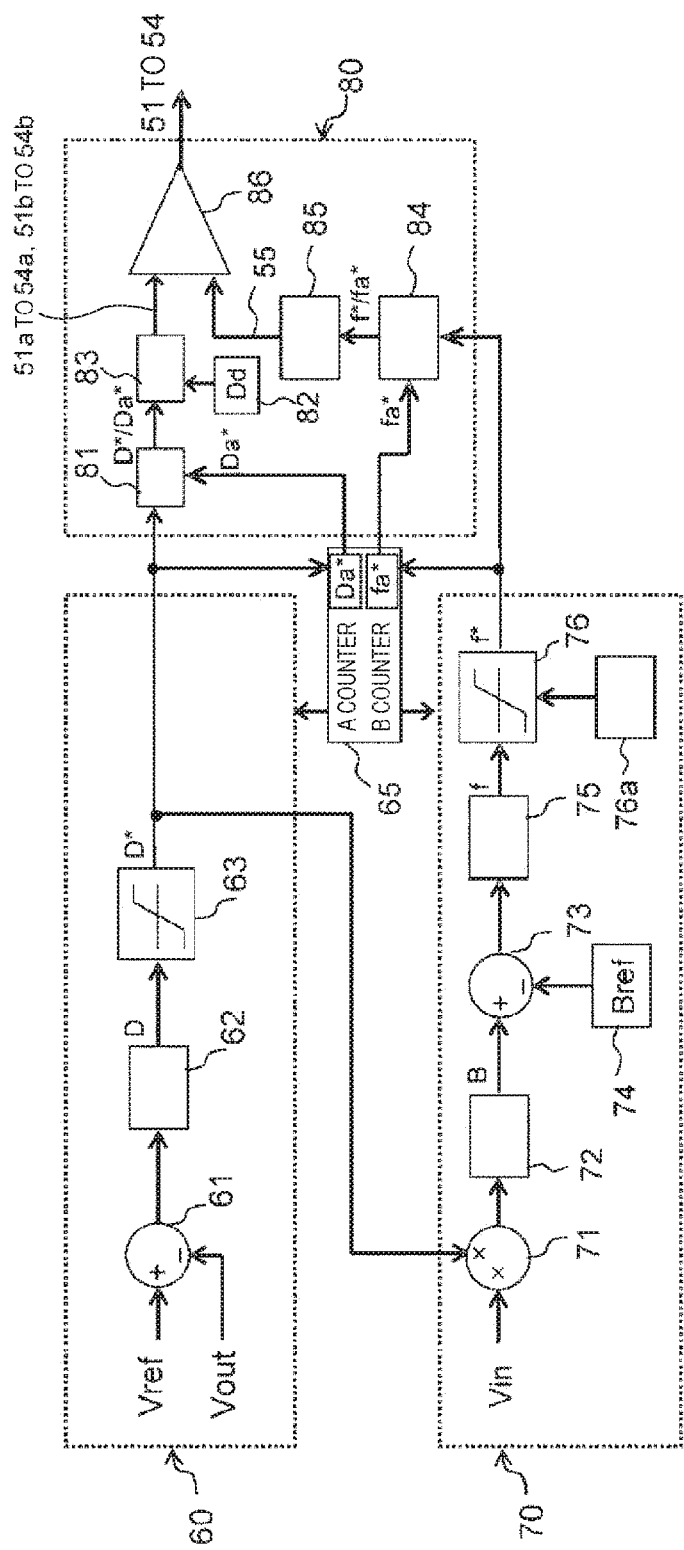
FIG. 12 illustrates a configuration of a control circuit according to a fifth embodiment of the present invention.

FIG. 12 illustrates a configuration of a control circuit 50 according to the fifth embodiment of the present invention. As illustrated in FIG. 12, the control circuit 50 according to the present embodiment has a configuration similar to that described in the first embodiment except for that the switching carrier frequency setting unit 70 further includes a limit value setting unit 76a connected to the frequency limiting unit 76. The limit value setting unit 76a will be described below.

(Limit Value Setting Unit 76a)

The limit value setting unit 76a determines an upper limit and a lower limit of a switching carrier frequency setting value f* supplied from the frequency limiting unit 76, that is, a maximum switching carrier frequency fmax and a minimum switching carrier frequency fmin in the above formula (2) and then supplies these values thus determined to the frequency limiting unit 76. The limit value setting unit 76a determines the maximum switching carrier frequency fmax, for example, in accordance with a target value of a magnetic flux density based on a saturation magnetic flux density of a transformer 20, that is, a magnetic flux density command value Bref, and a cross-sectional area of a core of the transformer 20 and the number of turns of a primary winding N1.

On the other hand, the limit value setting unit 76a determines the minimum switching carrier frequency fmin, for example, in accordance with an upper limit of a magnetic flux density preset based on a saturation magnetic flux density of an insulating transformer 90a in a gate driver 90. Specifically, the limit value setting unit 76a determines the minimum switching carrier frequency fmin by using the following formula (3) so that the magnetic flux density of the insulating transformer 90a does not exceed the saturation magnetic flux density even when the switching carrier frequency is lowered. In the formula (3), Vdd is a voltage value input to the gate driver 90 via the insulating transformer 90a, As is a core cross-sectional area of the insulating transformer 90a, Bmax is an upper limit of a magnetic flux density of the insulating transformer 90a, and N1 is the number of turns of the insulating transformer 90a.

[Math. 1]

$$f_{min\_1} = \frac{V_{dd} \times 0.5}{2A_s \times B_{max} \times N_1} \quad (3)$$

The limit value setting unit 76a may determine the minimum switching carrier frequency fmin, for example, so that a current ripple flowing through a smoothing coil L2 in the output circuit 30 is equal to or less than a predetermined ripple current value. Specifically, the limit value setting unit 76a determines the minimum switching carrier frequency fmin by using the following formula (4) so that a current ripple in the output current from the output circuit 30 flowing through the smoothing coil L2 does not exceed a predetermined ripple current value even in a case where the switching carrier frequency is lowered. In the formula (4), Vin is an input voltage value of the DC-DC converter 100 detected by the voltage detector 41, Vout is an output voltage of the DC-DC converter 100 detected by the voltage detector 42, D* is a duty instruction value found by the voltage control unit 60, L2 is an inductance value of the smoothing coil L2, ΔILmax is a difference between a peak maximum ripple current value and a peak maximum ripple current value, and Nt is a turn ratio of the transformer 20.

[Math. 2]

$$f_{min\_2} = \left(\frac{V_{in}}{N_t} - V_{out}\right) \times \frac{D^*}{L_2 \times \Delta I_{Lmax}} \quad (4)$$

The limit value setting unit 76a may determine the minimum switching carrier frequency fmin by using a formula other than the above formulas (3) and (4). The limit value setting unit 76a can determine the minimum switching carrier frequency fmin by any method as long as the magnetic flux density of the insulating transformer 90a does not exceed the saturation magnetic flux density or the current ripple in the output current from the output circuit 30 does not exceed a predetermined ripple current value. Note that the limit value setting unit 76a can also determine the minimum switching carrier frequency fmin based on both the saturation magnetic flux density of the insulating transformer 90a and the current ripple in the output current or based on other information.

According to the fifth embodiment of the present invention described above, the switching circuit 10 is connected to the control circuit 50 via the gate driver 90, which is an insulating gate driver including the insulating transformer 90a. Furthermore, the switching carrier frequency setting unit 70 has the frequency limiting unit 76 that limits the switching carrier frequency to a predetermined minimum switching carrier frequency fmin or higher, and the limit value setting unit 76a determines the minimum switching carrier frequency fmin based on at least one of the saturation magnetic flux density of the insulating transformer 90a and the current ripple in the output current from the output circuit 30. This can prevent not only magnetic saturation of the transformer 20, but also magnetic saturation of the insulating transformer 90a in the gate driver 90 and an increase of the current ripple in the output current of the DC-DC converter 100 in addition to the effects described in the first embodiment.

In each of the embodiments of the present invention described above, the present invention has been described by using an example in which the control circuit 50 controls, according to a phase shift control method, the DC-DC converter 100 combining the switching circuit 10, which is a voltage-type full-bridge circuit made up of the four switch elements 11a to 14a, and the transformer 20, which is a current-type center-tapped circuit. However, the present invention is not limited to this. The present invention is applicable to any control device that controls a power conversion device having a switching circuit that converts an input first DC power into AC power, a transformer that performs voltage conversion of the AC power, and an output circuit that converts the AC power subjected to the voltage conversion by the transformer into second DC power and outputs the second DC power, and effects similar to those described in the above embodiments can also be produced. Furthermore, each of the embodiments described above may be applied independently or may be combined in any way.

The embodiments and various modifications described above are merely examples, and the present invention is not limited to these embodiments and various modifications as long as the features of the invention are not impaired. Although various embodiments and modifications have been described above, the present invention is not limited to these embodiments and modifications. Other embodiments within the scope of the technical idea of the present invention are also encompassed in the scope of the present invention.

REFERENCE SIGNS LIST 1 positive input terminal
2 negative input terminal
3 positive output terminal
4 negative output terminal
10 switching circuit
11a to 14a switch element
11b to 14b diode
11c to 14c capacitor
20 transformer
30 output circuit
31, 32 diode
41, 42 voltage detector
43 temperature detector
44 current detector
50 control circuit
51 to 54 output signal
60 voltage control unit
61 subtraction unit
62 PI control unit
63 duty limiting unit
65 clock unit
70 switching carrier frequency setting unit
71 multiplying unit
72 proportional unit
73 subtraction unit
74 magnetic flux density command value setting unit
75 PI control unit
75a gain adjustment unit
76 frequency limiting unit 76a limit value setting unit
80 signal generation unit
81 calculation determination unit
82 dead time setting unit
83 threshold setting unit
84 calculation determination unit
85 carrier signal generation unit
86 comparator
90 gate driver
90a insulating transformer
91 to 94 drive signal
100 DC-DC converter
200 vehicle power supply control unit
300 HV equipment
400 auxiliary equipment
1000 vehicle
N1 primary winding
N2a, N2b secondary winding
S rectification connection point
T neutral point
V1 high-voltage battery
V2 low-voltage battery

The invention claimed is:

1. A control device that controls a power conversion device that converts input first DC power into second DC power and outputs the second DC power, the control device comprising:
a voltage control unit that calculates a duty instruction value for controlling an output voltage of an output circuit;
a switching carrier frequency setting unit that calculates a magnetic flux density value based on the duty instruction value and an input voltage of a switching circuit and sets a switching carrier frequency according to a drive frequency based on the calculated magnetic flux density value; and
a signal generation unit that generates an output signal for driving the switching circuit based on the duty instruction value and the switching carrier frequency and supplies the generated output signal to the switching circuit,
wherein the power conversion device includes the switching circuit that converts the first DC power into AC power, a transformer that performs voltage conversion of the AC power, and the output circuit that converts the AC power subjected to the voltage conversion by the transformer into the second DC power,
wherein the control device calculates the magnetic flux density value of the transformer and controls the drive frequency of the switching circuit based on the calculated magnetic flux density value,
wherein the switching carrier frequency setting unit sets the switching carrier frequency so that the drive frequency is lowered in a case where the magnetic flux density value is smaller than a predetermined magnetic flux density command value based on a saturation magnetic flux density of the transformer and so that the drive frequency is increased in a case where the magnetic flux density value is larger than the predetermined magnetic flux density command value, and
wherein the power conversion device further includes a temperature detector that detects a temperature of the transformer, and
the switching carrier frequency setting unit changes the predetermined magnetic flux density command value based on the temperature of the transformer detected by the temperature detector.

2. The control device according to claim 1, further comprising a clock unit that controls execution timings of the voltage control unit and the switching carrier frequency setting unit.

3. The control device according to claim 1, wherein
the power conversion device further includes a current detector that detects an output current from the output circuit, and
the switching carrier frequency setting unit changes the predetermined magnetic flux density command value based on the detected value of the output current detected by the current detector.

4. The control device according to claim 1, wherein
the switching carrier frequency setting unit has a PI control unit that performs proportional-integral control based on a difference between the magnetic flux density value and the predetermined magnetic flux density command value by using a predetermined control gain, and
the predetermined control gain is changed based on at least one of the switching carrier frequency and an output current from the output circuit.

5. The control device according to claim 1, wherein
the switching circuit is connected to the control device via an insulating gate driver provided with an insulating transformer,
the switching carrier frequency setting unit has a frequency limiting unit that limits the switching carrier frequency to a predetermined minimum frequency or higher, and
the predetermined minimum frequency is determined based on at least one of a saturation magnetic flux density of the insulating transformer and a current ripple in an output current from the output circuit.

6. A control device that controls a power conversion device that converts input first DC power into second DC power and outputs the second DC power, the control device comprising:
a voltage control unit that calculates a duty instruction value for controlling an output voltage of an output circuit;
a switching carrier frequency setting unit that calculates a magnetic flux density value based on the duty instruction value and an input voltage of a switching circuit and sets a switching carrier frequency according to a drive frequency based on the calculated magnetic flux density value; and
a signal generation unit that generates an output signal for driving the switching circuit based on the duty instruction value and the switching carrier frequency and supplies the generated output signal to the switching circuit,
wherein the power conversion device includes the switching circuit that converts the first DC power into AC power, a transformer that performs voltage conversion of the AC power, and the output circuit that converts the AC power subjected to the voltage conversion by the transformer into the second DC power,
wherein the control device calculates the magnetic flux density value of the transformer and controls the drive frequency of the switching circuit based on the calculated magnetic flux density value,
wherein the switching carrier frequency setting unit sets the switching carrier frequency so that the drive frequency is lowered in a case where the magnetic flux density value is smaller than a predetermined magnetic flux density command value based on a saturation magnetic flux density of the transformer and so that the drive frequency is increased in a case where the magnetic flux density value is larger than the predetermined magnetic flux density command value, and wherein the power conversion device further includes a current detector that detects an output current from the output circuit, and the switching carrier frequency setting unit changes the predetermined magnetic flux density command value based on the detected value of the output current detected by the current detector.

7. The control device according to claim 6, further comprising a clock unit that controls execution timings of the voltage control unit and the switching carrier frequency setting unit.

8. The control device according to claim 6, wherein the power conversion device further includes a temperature detector that detects a temperature of the transformer, and the switching carrier frequency setting unit changes the predetermined magnetic flux density command value based on the temperature of the transformer detected by the temperature detector.

9. The control device according to claim 6, wherein the switching carrier frequency setting unit has a PI control unit that performs proportional-integral control based on a difference between the magnetic flux density value and the predetermined magnetic flux density command value by using a predetermined control gain, and the predetermined control gain is changed based on at least one of the switching carrier frequency and the output current from the output circuit.

10. The control device according to claim 6, wherein the switching circuit is connected to the control device via an insulating gate driver provided with an insulating transformer, the switching carrier frequency setting unit has a frequency limiting unit that limits the switching carrier frequency to a predetermined minimum frequency or higher, and the predetermined minimum frequency is determined based on at least one of a saturation magnetic flux density of the insulating transformer and a current ripple in the output current from the output circuit.

11. A control device that controls a power conversion device that converts input first DC power into second DC power and outputs the second DC power, the control device comprising:

a voltage control unit that calculates a duty instruction value for controlling an output voltage of an output circuit;

a switching carrier frequency setting unit that calculates a magnetic flux density value based on the duty instruction value and an input voltage of a switching circuit and sets a switching carrier frequency according to a drive frequency based on the calculated magnetic flux density value; and a signal generation unit that generates an output signal for driving the switching circuit based on the duty instruction value and the switching carrier frequency and supplies the generated output signal to the switching circuit, wherein the power conversion device includes the switching circuit that converts the first DC power into AC power, a transformer that performs voltage conversion of the AC power, and the output circuit that converts the AC power subjected to the voltage conversion by the transformer into the second DC power, wherein the control device calculates the magnetic flux density value of the transformer and controls the drive frequency of the switching circuit based on the calculated magnetic flux density value, wherein the switching carrier frequency setting unit sets the switching carrier frequency so that the drive frequency is lowered in a case where the magnetic flux density value is smaller than a predetermined magnetic flux density command value based on a saturation magnetic flux density of the transformer and so that the drive frequency is increased in a case where the magnetic flux density value is larger than the predetermined magnetic flux density command value, and wherein the switching carrier frequency setting unit has a PI control unit that performs proportional-integral control based on a difference between the magnetic flux density value and the predetermined magnetic flux density command value by using a predetermined control gain, and the predetermined control gain is changed based on at least one of the switching carrier frequency and an output current from the output circuit.

12. The control device according to claim 11, further comprising a clock unit that controls execution timings of the voltage control unit and the switching carrier frequency setting unit.

13. The control device according to claim 11, wherein the power conversion device further includes a temperature detector that detects a temperature of the transformer, and the switching carrier frequency setting unit changes the predetermined magnetic flux density command value based on the temperature of the transformer detected by the temperature detector.

14. The control device according to claim 11, wherein the power conversion device further includes a current detector that detects the output current from the output circuit, and the switching carrier frequency setting unit changes the predetermined magnetic flux density command value based on the detected value of the output current detected by the current detector.

15. The control device according to claim 11, wherein the switching circuit is connected to the control device via an insulating gate driver provided with an insulating transformer, the switching carrier frequency setting unit has a frequency limiting unit that limits the switching carrier frequency to a predetermined minimum frequency or higher, and the predetermined minimum frequency is determined based on at least one of a saturation magnetic flux density of the insulating transformer and a current ripple in the output current from the output circuit.

\* \* \* \* \*